US008244248B2

(12) United States Patent
Forssell et al.

(10) Patent No.: US 8,244,248 B2
(45) Date of Patent: Aug. 14, 2012

(54) VERTICAL HANDOVER

(75) Inventors: Mika Forssell, Soderkulla (FI); Pasi Sarolahti, Helsinki (FI); Fan Yang, Helsinki (FI)

(73) Assignee: Nokia Corporation, Espoo (FI)

( * ) Notice: Subject to any disclaimer, the term of this patent is extended or adjusted under 35 U.S.C. 154(b) by 698 days.

(21) Appl. No.: 11/591,119

(22) Filed: Oct. 31, 2006

(65) Prior Publication Data

US 2008/0064401 A1 Mar. 13, 2008

(30) Foreign Application Priority Data

Sep. 13, 2006 (FI) .................................... 20065562

(51) Int. Cl.
*H04W 36/00* (2009.01)
*H04W 4/00* (2009.01)

(52) U.S. Cl. ........................ 455/436; 370/331

(58) Field of Classification Search .......... 370/331, 370/332, 333, 338, 328, 329; 455/436–444, 455/422.1, 423
See application file for complete search history.

(56) References Cited

U.S. PATENT DOCUMENTS

| | | | | |
|---|---|---|---|---|
| 6,393,003 B1 * | 5/2002 | Lee | ............................. | 370/331 |
| 2004/0076179 A1 * | 4/2004 | Kaminski et al. | ............. | 370/466 |
| 2005/0271011 A1 * | 12/2005 | Alemany et al. | ............. | 370/331 |
| 2006/0010272 A1 * | 1/2006 | Solomon et al. | ............. | 710/105 |
| 2006/0014539 A1 * | 1/2006 | Oh | ............................... | 455/436 |
| 2006/0039327 A1 * | 2/2006 | Samuel et al. | ................ | 370/331 |
| 2006/0084417 A1 * | 4/2006 | Melpignano et al. | ......... | 455/418 |
| 2006/0109819 A1 * | 5/2006 | Marin et al. | .................... | 370/331 |
| 2006/0148479 A1 * | 7/2006 | Park et al. | ..................... | 455/437 |
| 2006/0200543 A1 * | 9/2006 | Kong et al. | ..................... | 709/223 |
| 2006/0221901 A1 * | 10/2006 | Yaqub et al. | .................. | 370/331 |
| 2006/0291417 A1 * | 12/2006 | Aust et al. | ..................... | 370/331 |
| 2007/0021119 A1 * | 1/2007 | Lee et al. | ....................... | 455/436 |
| 2007/0072605 A1 * | 3/2007 | Poczo | ......................... | 455/432.2 |
| 2007/0072614 A1 * | 3/2007 | Forsberg | ........................ | 455/436 |
| 2007/0082697 A1 * | 4/2007 | Bumiller et al. | ............ | 455/552.1 |
| 2007/0091844 A1 * | 4/2007 | Huang et al. | ................... | 370/331 |
| 2007/0133467 A1 * | 6/2007 | Hsu et al. | ....................... | 370/331 |
| 2007/0280176 A1 * | 12/2007 | Silverman et al. | ............ | 370/338 |
| 2008/0031188 A1 * | 2/2008 | Magnusson et al. | .......... | 370/329 |
| 2008/0049673 A1 * | 2/2008 | Park et al. | ...................... | 370/331 |
| 2008/0102843 A1 * | 5/2008 | Todd et al. | ..................... | 455/445 |
| 2008/0137613 A1 * | 6/2008 | Berg et al. | ..................... | 370/331 |

FOREIGN PATENT DOCUMENTS

| WO | WO 00/72620 A1 | 11/2000 |
|---|---|---|
| WO | WO 2005/071866 A1 | 8/2005 |
| WO | WO 2005071866 A1 * | 8/2005 |

* cited by examiner

*Primary Examiner* — Michael Faragalla
(74) *Attorney, Agent, or Firm* — Harrington & Smith

(57) ABSTRACT

A vertical handover decision to perform a seamless vertical handover of a wireless apparatus from a current access network to a target access network is established. When deciding to perform the vertical handover from the current access network to the target access network it can be considered whether an intermediate access network could be used. It can be decided that first a seamless vertical handover is performed from the current access network to an intermediate access network, and subsequently a seamless vertical handover from the intermediate access network to the target access network is performed.

22 Claims, 6 Drawing Sheets

VERTICAL HANDOVER

FIELD OF THE INVENTION

The present invention relates to vertical handover.

BACKGROUND OF THE INVENTION

Current wireless devices are able to access services via a number of different access technologies and networks. One may consider cost, quality of service (QoS), reliability, et cetera when selecting an access network to be used for an application level connection (application connection). For example, wireless local area network (WLAN) can be used for email downloads when such a known network is available, and otherwise a general packet radio service (GPRS) network or wideband code division multiple access (WCDMA) network can be used.

When taking a new access network into use, several protocol layers and functions need to be configured. For example, when taking a WLAN access network into use, WLAN authentication and QoS negotiation may have to be done, and an internet protocol (IP) layer may have to configure a new IP address, a domain name system (DNS) name, et cetera into use before application data transmission may be carried via the access network.

When utilizing available access networks dynamically, a handover may have to be performed when the used access network becomes unavailable or a more preferred access network becomes available.

Handover means moving a connection from one network to another one. There are two kinds of handovers. One is to move a connection within the same access network. This is the case for example when making cell reselections within one public land mobile network (PLMN). This is called a horizontal handover. Moving a connection between two different access networks, for example between WLAN networks operated by different operators or between a home WLAN and an operator WCDMA network, is called a vertical handover.

The purpose of a handover is to provide service continuity for users and applications. For example, moving a connection from a GPRS network to a WLAN network may offer the user a cheaper service when the WLAN network is available, and moving the connection back to the GPRS network again is to guarantee that a connection can be continued when the WLAN network becomes unavailable.

A general condition for a handover is that it should be seamless. This can mean, for example, that the handover should cause only little delay and it should not affect the application connection(s). In other words, the handover should occur without causing substantial delay or interruption in application level connection(s). Even when a connection is under handover the user should perceive no substantial changes in the connection.

However, in many cases during handover, application connections may suffer from delay, packet losses, et cetera. For example, a voice over IP (VoIP) application does not typically tolerate too long delays, or otherwise the voice quality suffers too much.

When performing a handover from an access network A to an access network B, the experienced delay depends on used access network configurations (for example, authentication and QoS negotiation used) and the access technologies of networks A and B. For example, when performing a handover from a WLAN network to a GPRS network having already active PDP contexts, application data transmission may typically continue immediately after handover. However, when performing a handover from a WLAN network to another WLAN network or between a WLAN network and a worldwide interoperability for microwave access (WiMAX) network, substantial delay (several seconds) may be introduced. This is mainly because the source and target access network may not be active at the same time. The new (target) access network needs to be configured before application data transmission may continue, and during the configuration application data transmission is suspended.

Traditionally, a fixed access network is used in most of the mobile devices. Some advanced phones may be able to select access networks based on network priorities and characteristics.

Current multi-radio mobile devices also have limitations affecting the handover procedure. For example, two WLAN networks can not be active for one device at the same time (this would require two Rx/Tx pairs, however even this might lead into interference (for example, when two WLAN networks operate at the same/closely located channel)). Also, WLAN and WiMAX networks can not be active at the same time, since there is too much interference, and/or same radio frequency (RF) components/pipes might be used for accessing both networks, and so on. All this means that when performing a vertical handover between such access networks, basically all operations including application data transmission has to be stopped in the access network currently in use, and then the new (target) access network has to be properly taken into use before data transmission can occur. During this time, which may be several seconds, application data transmission is suspended and data packets sent to the mobile device would normally be lost.

It is also possible that even if the source and target access networks could be active at the same time on radio level, a configuration problem may occur, for example, an IP layer configuration may fail for the target access network (for example, the target access network might block access to service). These kinds of problems are typically discovered only after taking the target access network into use, thus leading to increased delay and confusion from the application and user points of view.

SUMMARY

According to a first aspect of the invention there is provided a method for vertical handover comprising:
establishing a decision to perform a vertical handover of a wireless apparatus from a current access network to a target access network; and
further deciding to perform the vertical handover from the current access network to the target access network via at least one intermediate access network.

To support seamless handover and service continuity an embodiment of the invention proposes a mechanism according to which, in problematic cases where performing vertical handover from access network A to access network B, an intermediate access network C is used. An application connection is handed from A to C to B instead of directly from A to B. For example, when moving an application connection between operator and home WLAN networks, a cellular network may be used as an intermediate network. This decreases delay experienced by the application and the user, minimizes packet losses and negative effects which could have been experienced if the application connection had been directly handed from access network A to B.

In an embodiment, the intermediate access network and the target access network are selected from a group of access networks which the wireless apparatus sees at the time of decision making.

In an embodiment, the method comprises deciding, by a decision unit, that the vertical handover from the current access network to the target access network is performed in a seamless manner. This is achieved by first performing a seamless vertical handover from the current access network to an intermediate access network, and subsequently performing a seamless vertical handover from the intermediate access network to the target access network.

The definition of a seamless vertical handover has been presented in the preceding. In accordance with an embodiment, the seamless vertical handover means a vertical handover without causing substantial interruption in ongoing application level connections.

In an embodiment, the method comprises deciding to perform the vertical handover via said at least one intermediate access network if the current access network and target access network can not be simultaneously active for the wireless apparatus.

In an embodiment, the method comprises deciding that the intermediate access network is used for waiting when the wireless apparatus sees the target access network but access to the target access network is temporarily unavailable.

In an embodiment, the method comprises:
performing a vertical handover from the current network to an intermediate network;
checking the characteristics of the target network while being in the intermediate network; and
making a final decision whether to perform handover from the intermediate network to the target access network only after the characteristics of the target network have been checked.

In an embodiment, the characteristics of the source and target access network are taken into consideration when establishing a vertical handover decision between the access networks. If it is considered, by a decision unit located in a wireless device or in a network, that a seamless vertical handover can not be performed directly between two access networks, the handover may be performed via one or more intermediate access networks.

According to a second aspect of the invention there is provided an apparatus comprising:
a decision unit configured to establish a decision to perform a vertical handover of a wireless apparatus from a current access network to a target access network, wherein
the decision unit is further configured to decide that the vertical handover from the current access network to the target access network is performed via at least one intermediate access network.

In an embodiment, the decision unit resides in said wireless apparatus. In another embodiment, the decision unit is located in a network-based apparatus, such as a network server.

In an embodiment of the invention a connection from a current access network to an intermediate access network is moved (that is, a handover is performed) when and only when the configuration of the intermediate access network is ready and the connection again to a target access network is moved when and only when the target access network is ready. Therefore, time delay for network configuration does not affect users using the connection. In other words the connection is not using a network that is not yet fully configured, but instead it is kept in a configuration-ready network.

An embodiment of the invention concentrates on ensuring quality in a target access network. A first vertical handover is performed to an intermediate access network. If the second vertical handover step is not urgent, the quality of the target access network can be verified first via, for example, radio measurements, registering to the target access network and ensuring that required service level is supported, ensuring that the target access network provides required connectivity (e.g., access to a mail server is provided) etc. After the quality of the target network is proven, the connection is moved there (i.e., the second vertical handover step is performed).

According to third aspect of the invention there is provided a method for vertical handover comprising:
establishing a decision to perform a vertical handover of a wireless apparatus from a current access network to a target access network;
making a distinction between seamless and non-seamless vertical handovers when establishing the decision; and
selecting the target access network from a group of available target networks on the basis the vertical handover becoming seamless.

In an embodiment, a wireless apparatus may have an ongoing application connection via the current access network. When the current network begins to disappear, there may be different access networks available for vertical handover. Available vertical handovers may be classified in accordance with an embodiment into seamless and non-seamless ones. In this embodiment, the decision to perform a vertical handover may be based on the following criterion: If a seamless vertical handover is available, select a target access network so that the vertical handover is seamless.

According to a fourth aspect of the invention there is provided an apparatus comprising:
a decision unit for establishing a decision to perform a vertical handover of a wireless apparatus from a current access network to a target access network, wherein
the decision unit is configured to make a distinction between seamless and non-seamless vertical handover when establishing the decision, and to select the target access network from a group of available target networks on the basis that the vertical handover becomes seamless.

According to yet another embodiment there is provided a computer program product comprising program code or software executable in the apparatus of the second aspect in order to carry out the method of the first aspect.

According to yet another embodiment there is provided a computer program product comprising program code or software executable in the apparatus of the fourth aspect in order to carry out the method of the third aspect.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED SPECIFICATION

Figure 1:
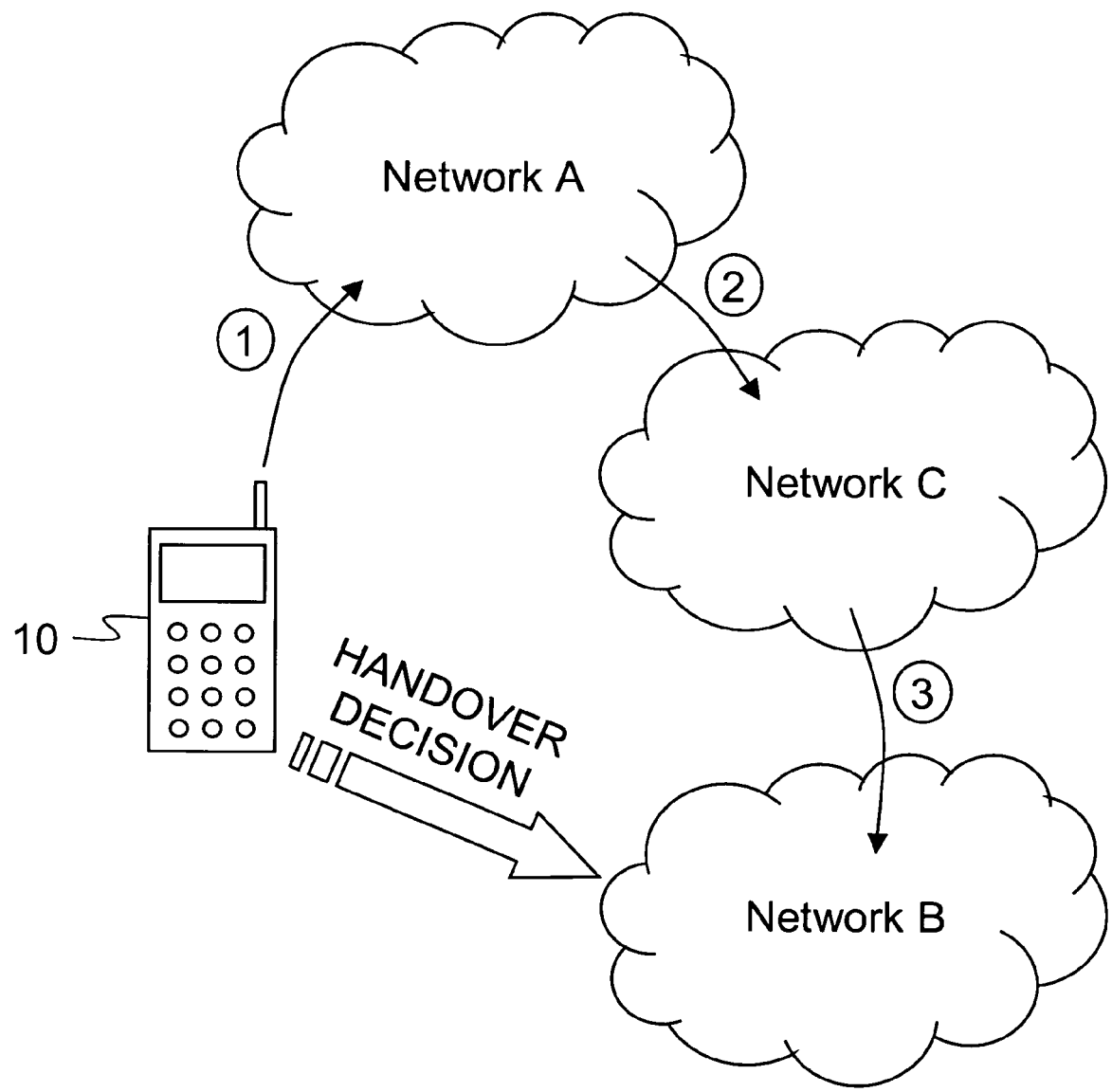
FIG. 1 shows a vertical handover scheme in accordance with an embodiment of the invention.

FIG. 1 shows a vertical handover scheme in accordance with an embodiment of the invention. In this embodiment, a wireless apparatus 10 lies within the service area of different access networks (A, B and C). The wireless apparatus 10 has been originally registered to the access network A in step 1. It is also assumed that the wireless apparatus has activated an application connection via access network A.

In an embodiment, the wireless apparatus 10 is a mobile terminal, mobile phone, a personal digital assistant (PDA) device with wireless access or a laptop computer. In another embodiment, the wireless apparatus 10 is any wireless device or wireless module or combination capable of wireless communication. The access networks A, B and C can be different access networks including but not limited to different WLAN networks (home WLAN, corporate WLAN, operator WLAN), cellular radio frequency networks including but not limited to GSM GPRS networks, WCDMA networks and 4G networks, WiMAX networks, ultra wideband (UWB) networks and Bluetooth networks. The access networks A, B and C may be networks which provide limited range but high bit rate. The application connection may be any application connection in which some sort of data is transmitted. Some examples are a VoIP connection, an audio and/or video streaming session or connection, an email connection, and so on.

In a situation in which access network A starts to disappear, or a more preferred access network B appears, a handover from access network A to another access network becomes desirable. FIG. 1 illustrates a situation in which it is decided that access network B is a suitable target access network. However, the case may be, for example, such that the wireless apparatus 10 can not use both access networks A (for example, a WLAN network) and B (for example, a WiMAX network) at the same time, but can use access networks A and C (for example, a WCDMA network) simultaneously, and access networks B and C simultaneously. Then it may be more desirable, instead of performing a direct handover from A to B, to perform a handover via the intermediate access network C. This is illustrated in FIG. 1. The handover is performed in two phases: first a handover from network A to network C is performed as illustrated by step 2, and subsequently a handover from network C to network B is performed as illustrated by step 3. No such discontinuity in application connection is experienced, which would have been experienced if the handover had been performed directly from network A to network B.

The decision on performing handover directly between access networks A and B (A→B) or whether to use intermediate access network C (A→C→B) can be done based on the following rules or criteria:

If the source access network A and the destination access network B can not be active at the same time, for example, due to radio interference or because they are accessed using the same radio functionalities/components, use access network C, if access networks A and C can be simultaneously active, and C and B can be simultaneously active. If access networks A and B can be used at the same time and they are known to be usable, use of intermediate access network C is not likely to be needed, but the handover can be performed directly from network A to network B.

If characteristics (for example the ability to support QoS or a defined service) of target access network B are not known and if source access network A is disappearing, use access network C for the period of time that it takes to resolve the characteristics of access network B. As soon as the characteristics have been resolved and possibly negotiated, make a final decision whether access network B is suitable to be used (and perform the second phase of handover).

If access network B would be the preferred target access network but the wireless apparatus can not access B at a given moment (for example, due to admission control and/or high traffic load), use intermediate access network C for waiting until access network B can be accessed. For example, a user may prefer a WLAN network and desire to access it whenever such a network is available. In the meantime, a WCDMA network can be used. The wireless apparatus may contain a prioritized list of networks to be used.

If intermediate access network C provides a functionality, like authentication, credentials or similar, that is usable in target access network B when doing "the second phase handover" from access network C to B, using intermediate access network C might be an option.

The decision whether to perform a handover directly from source access network A to target access network B or whether to use intermediate access network C can be based on one single rule or criterion or any suitable combination. In addition or alternatively, other suitable criteria than the ones presented can also be used.

Figure 2:
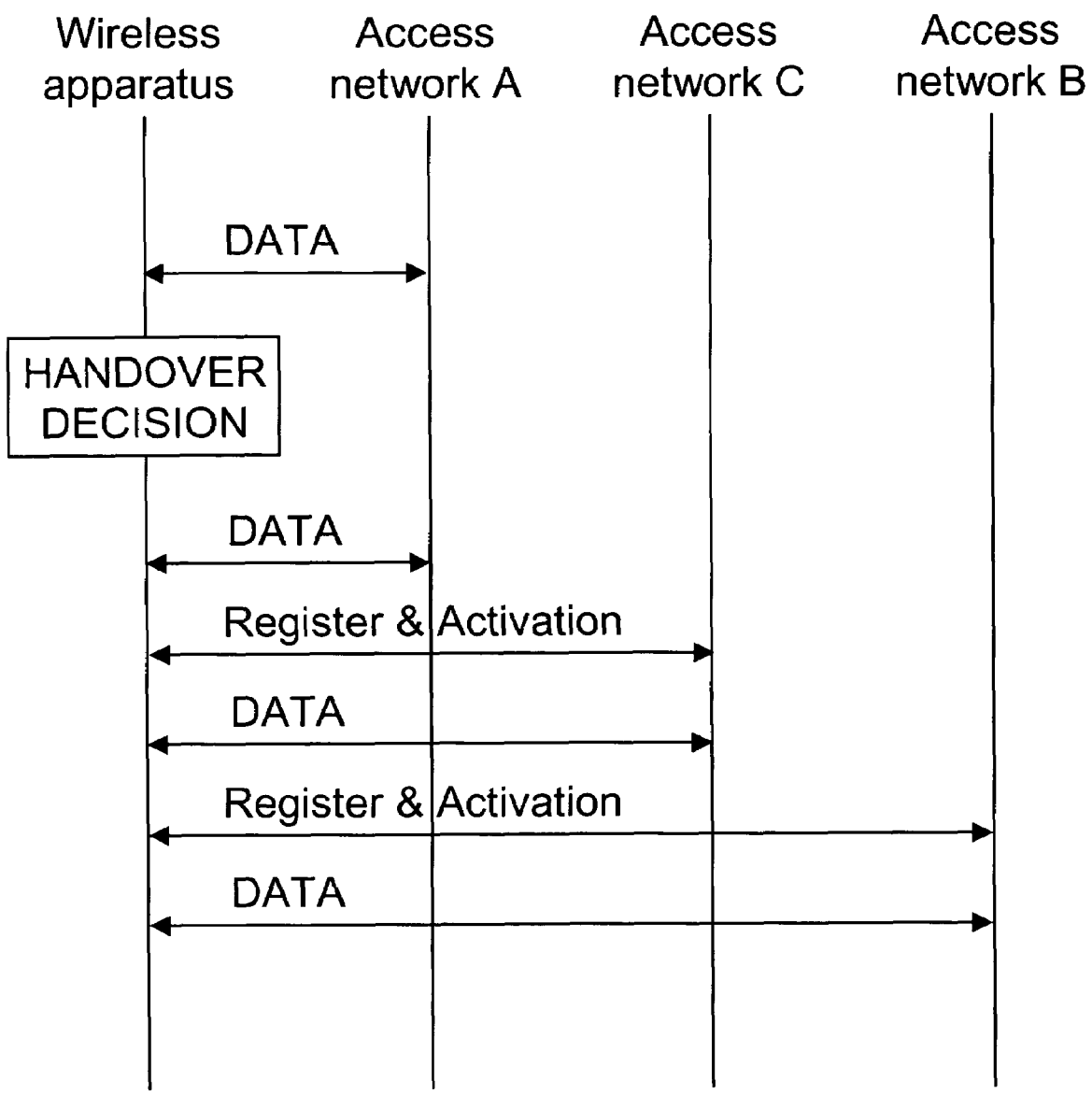
FIG. 2 shows a signaling diagram in accordance with an embodiment of the invention.

FIG. 2 shows a signaling diagram in accordance with an embodiment of the invention. A wireless apparatus has an ongoing data transmission connection (application connection) via a source access network A. While data is being transmitted over an application connection, a decision unit or module located either in the wireless apparatus or in the network decides that a handover is to be performed from the source access network A to a destination access network B via an intermediate access network C. The reasons behind this decision are not discussed here again.

In a first phase, while data is still being transmitted between the wireless apparatus and source access network A, the wireless apparatus registers to the intermediate access network C. Subsequently, the wireless apparatus activates a data connection (PDP context, data pipe activation (e.g., traffic stream (WLAN), service flow (WiMAX), stream (UWB)) or similar) with the intermediate access network C. In some cases, the registration or just accessing access network C (in here accessing means just sending data without additional procedures) may suffice and no data connection activation is needed. The following data packets are routed instead of source access network A to intermediate access network C. The first phase of the vertical handover is thereby completed.

In a second phase, while the handover situation has been stabilized and data is still being transmitted between the wireless apparatus and intermediate access network C, the wireless apparatus registers to the target access network B. Subsequently, the wireless apparatus activates a data connection (PDP context, data pipe activation or similar) with the target access network B. In some cases, the registration may suffice and no data connection activation is needed. The following data packets are routed instead of intermediate access network C to target access network B. The second phase of the vertical handover is thereby completed.

The foregoing was presented as an example of a vertical handover via an intermediate access network. In another embodiment of the invention, a vertical handover does not necessarily occur via an intermediate access network. In this embodiment, a distinction is made between seamless and non-seamless vertical handovers. The main criterion used to decide about a vertical handover is that, whenever appropriate, the vertical handover should be selected so that the vertical handover is seamless.

The wireless apparatus may have an ongoing application connection via the current access network. When the current access network begins to disappear, there may be different access networks available for vertical handover. In this embodiment, the decision unit may use the following criterion:

If a seamless vertical handover is available, select a target access network so that the vertical handover is seamless.

Other criteria presented in the foregoing, can be used in addition in the decision making. One or more intermediate access networks can also be used.

For the purpose of this embodiment, the decision unit should be provided with information about which vertical handovers are seamless and which are non-seamless. This can be done, depending on the location of the decision unit or module, by storing into wireless apparatus memory or in a memory of a network-based apparatus (such a server in a network) information on different vertical handover types: which of them are seamless and which are non-seamless.

Figure 3:
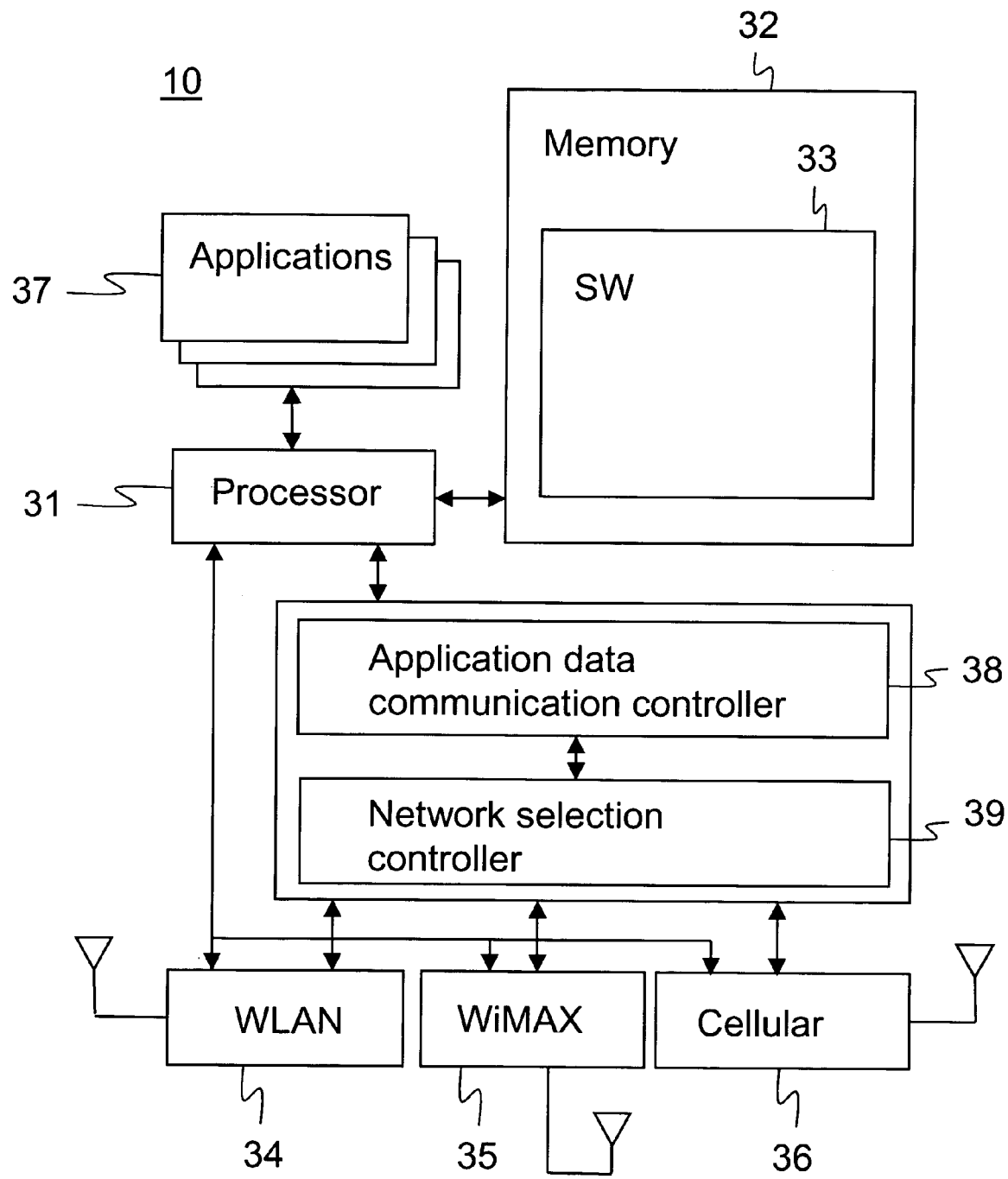
FIG. 3 shows a wireless apparatus according to an embodiment of the invention.

FIG. 3 shows a wireless apparatus according to an embodiment of the invention. The wireless apparatus 10 comprises a processor 31 for controlling the wireless apparatus 10, memory 32 coupled to processor 31 and computer program code or software 33, which is stored into the memory 32. The software 33 may include instructions for the processor 31 to control the operation of the wireless apparatus 10. In an embodiment, the wireless apparatus 10 is a mobile terminal, mobile phone, PDA device with wireless access or a laptop computer. In another embodiment, the wireless apparatus 10 is any wireless device or wireless module or combination capable of wireless communication.

For connecting to a WLAN network the wireless apparatus 10 comprises a WLAN transceiver 34, for connection to a WiMAX network the wireless apparatus 10 comprises a WiMAX transceiver 35, and for connection to a cellular radio network the wireless apparatus comprises a cellular radio transceiver 36. As is clear to a person skilled in the art, these radio technologies are mentioned as examples only. The wireless apparatus 10 can thereby be understood to be a multi-radio device. The transceivers 34, 35 and 36 are coupled to the processor 31. Further the wireless apparatus comprises applications 37 which can be alternatively understood to belong to apparatus software 33. An application data communication controller 38, which is coupled to the processor 31, controls application data transmission and reception towards and from access network(s). It forwards application requirements to a network selection controller 39. The network selection controller 39 is coupled to the processor 31. It functions as the decision unit or module, mentioned in the foregoing, as far as network selection decisions, including vertical handover decisions, are concerned. For this purpose, the network selection controller 39 has access to various measurement data (signal strength and quality measurements of visible access networks) and it knows the application requirements and rules or criteria stored into apparatus memory 32 so that it can make the handover decisions. The blocks 38 and 39 can be implemented by software, in which case they can be understood to belong to apparatus software 33, or by a suitable combination of hardware and software.

Figure 4:
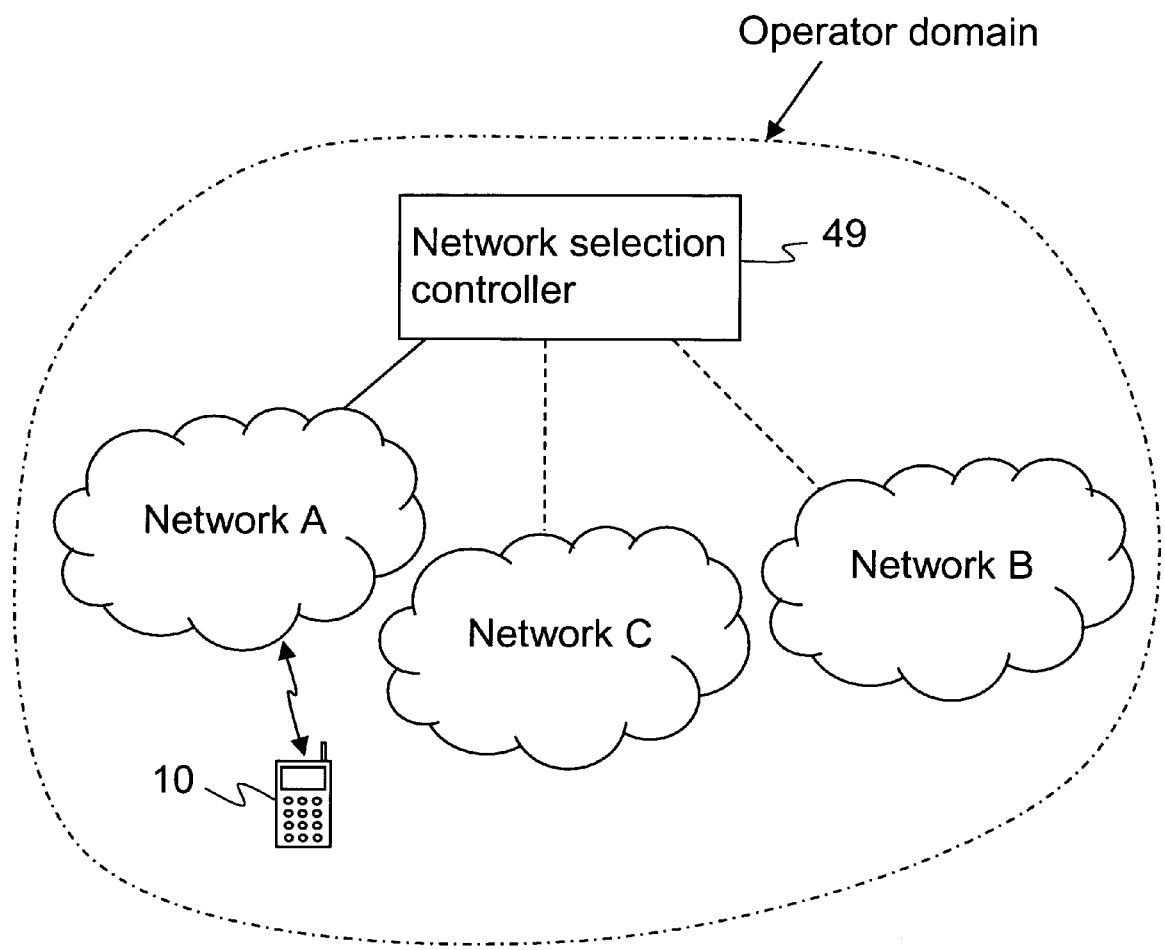
FIG. 4 shows an embodiment of the invention with a decision module in the network.

FIG. 4 shows an embodiment of the invention with a decision unit or module in the network. Contrary to what has been presented in the embodiment of FIG. 3, a decision unit or module corresponding to the presented network selection controller 39 can be alternatively located in the network. In the embodiment presented in FIG. 4, a network selection controller functionality or module 49 is arranged within a (telecom) operator's network, but outside of any access network A, B and C. The network selection controller functionality can be housed by a network server within operator domain. Alternatively, the network selection controller functionality or module 49 can be arranged in an independent server outside of operator network. When in operation, the network selection controller 49 should be in connection with at least that access network to which the wireless apparatus 10 is connected (here: access network A). The network selection controller 49 should also know the properties of the other applicable access networks (here: access networks B and C). The network selection controller 49 makes decisions on performing seamless handovers and/or handovers directly from a source access network to a target access network or whether to use an intermediate access network based on similar rules or criteria as described in the preceding. For the decision making, the wireless apparatus 10 forwards to the network selection controller 49 the various measurement data (signal strength and quality measurements of visible access networks) which it has measured. Alternatively or in addition a network element belonging to access network A may forward information based on which a vertical handover decision can be made. For example, a base station controller may forward radio quality derived information to the network selection controller 49.

Figure 5:
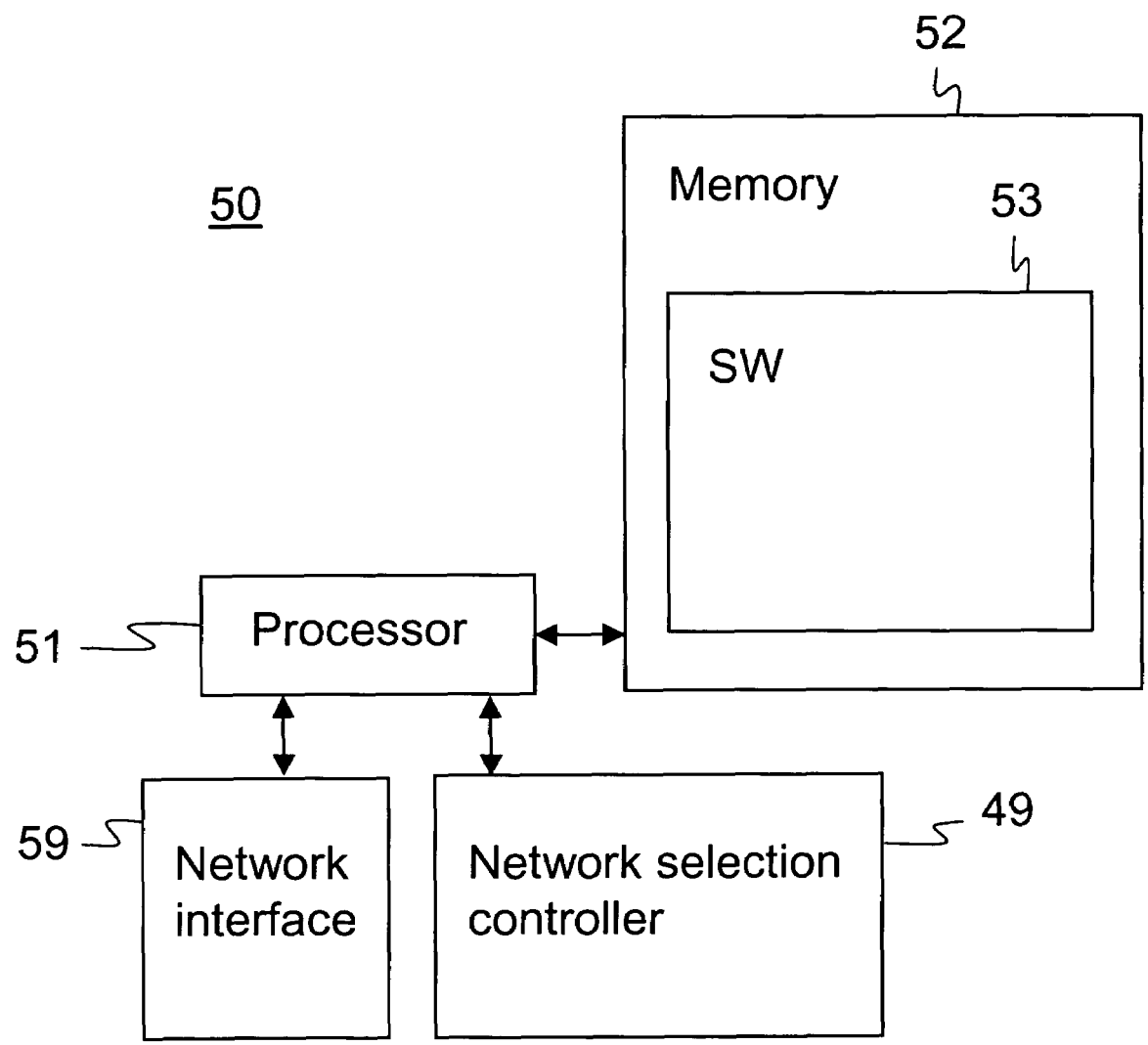
FIG. 5 shows a network-based apparatus with a decision module in accordance with an embodiment of the invention.

FIG. 5 shows a network-based apparatus with a decision module in accordance with an embodiment of the invention. In an embodiment, the network-based apparatus is a network server 50. The network server 50 comprises a processor 51 for controlling the network server 50, memory 52 coupled to processor 51 and computer program code or software 53, which is stored into the memory 52. The software 53 may include instructions for the processor 51 to control the operation of the network server 50.

For connecting to various networks, such as access networks A, B and C, the network server 50 comprises a network interface 59. The network interface 59 is coupled to the processor 51. Further the network server 50 comprises a network selection controller 49, which is coupled to the processor 51. It functions as the decision unit or module, mentioned in the foregoing, as far as network selection decisions, including vertical handover decisions, are concerned. For this purpose, the network selection controller 49 has access to various measurement data (signal strength and quality measurements of visible access networks, and/or traffic/load information of access networks (relating to admission control)) received from the wireless apparatus 10 or from a network element via the network interface 59, and it knows the application requirements and rules or criteria stored into network server memory 52 so that it can make the handover decisions. The block 49 can be implemented by software, in which case it can be understood to belong to network server software 53, or by a suitable combination of hardware and software.

Figure 6:
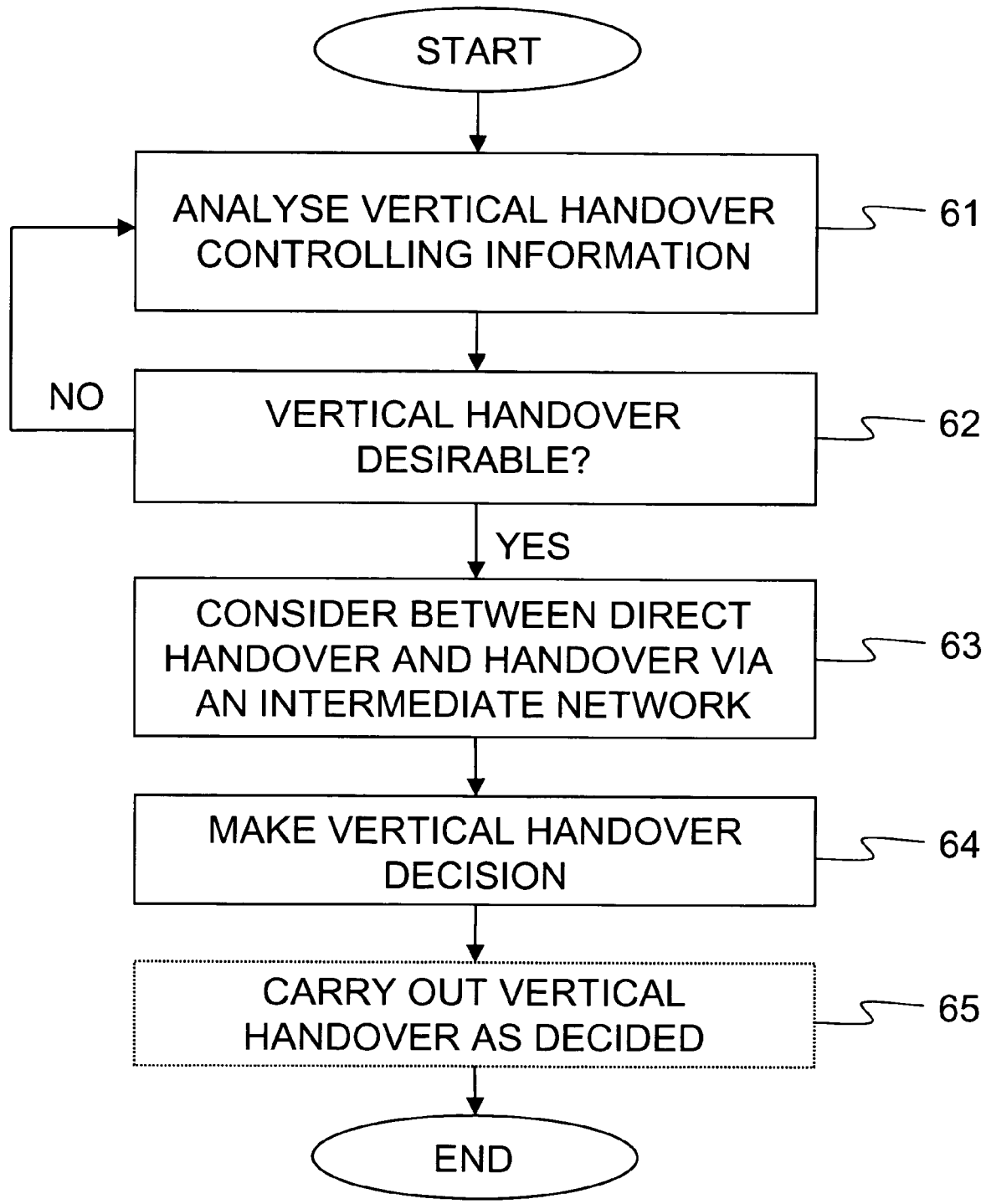
FIG. 6 shows a flow chart in accordance with an embodiment of the invention.

FIG. 6 shows a flow chart in accordance with an embodiment of the invention. In step 61 a decision unit or module analyses vertical handover controlling information. By the term controlling information is meant various information (as described in the preceding) based on which a vertical handover decision is made. In step 62 the decision unit or module considers, based on said information, whether a vertical handover is desirable. If not, one should return to step 61. If a vertical handover decision is desirable, the decision unit or module considers based on rules or criteria in step 63 whether a handover should be performed directly from source access network to target access network or whether an intermediate access network should be used. In step 64 the actual decision is made. After that the vertical handover is performed as decided.

Various embodiments of the invention have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best method and apparatus presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention could be used to advantage without the corresponding use of other features. As such, the foregoing description should be considered as merely illustrative of the principles of the present invention, and not in limitation thereof. Hence, the scope of the invention is only restricted by the appended patent claims.

We claim:

1. A method comprising:
    establishing, by a decision unit, a decision to perform a vertical handover of a wireless, apparatus from a current access network to a target access network that is different from the current access network;
    further deciding, by the decision unit, to perform the vertical handover from the current access network to the target access network via at least one intermediate access network;
    further deciding, by the decision unit, that the vertical handover from the current access network to the target access network is to be performed in a seamless manner by first performing a seamless vertical handover from the current access network to the at least one intermediate access network; and subsequently performing a seamless vertical handover from the at least one intermediate access network to the target access network, wherein the current access network, the target access network and the at least one intermediate access network are configured to provide wireless devices with access to services via wireless interfaces comprised therein;
    further deciding, by the decision unit, that the at least one intermediate access network is used for waiting when the wireless apparatus sees the target access network but access to the target access network is temporarily unavailable;
    performing the vertical handover of the wireless apparatus seamlessly by activating a connection with the at least one intermediate access network, wherein data sent via the connection with the at least one intermediate access network is not transmitted via the current access network or the target access network;
    checking the characteristics of the target network while being in the at least one intermediate network; and
    making a final decision whether to perform handover from the at least one intermediate network to the target access network only after the characteristics of the target network have been checked.

2. The method of claim 1, the method comprising:
    establishing the decision to perform the vertical handover based on at least one beforehand stored criterion.

3. The method of claim 1, wherein the at least one intermediate access network and the target access network are selected from a group of access networks which the wireless apparatus sees at the time of decision making.

4. The method of claim 1, wherein each of the seamless vertical handovers comprises a vertical handover without causing substantial interruption in application level connections.

5. The method of claim 1, wherein the method comprises deciding to perform the vertical handover via said at least one intermediate access network if the current access network and target access network can not be simultaneously active for the wireless apparatus.

6. An apparatus comprising:
    a processor; and
    a memory including computer program code,
    the memory and the computer program code configured to, with the processor, cause the apparatus at least to perform: establish a decision to perform a vertical handover of a wireless apparatus from a current access network to a target access network that is different from the current access network; further decide to perform the vertical handover from the current access network to the target access network via at least one intermediate access network; further decide that the vertical handover from the current access network to the target access network is to be performed in a seamless manner by first performing a seamless vertical handover from the current access network to the at least one intermediate access network; further, decide that the at least one intermediate access network is used for waiting when the wireless apparatus sees the target access network but access to the target access network is temporarily unavailable; perform the vertical handover seamlessly by activating a connection with the at least one intermediate access network, wherein the apparatus further comprises at least one wireless interface configured to enable the apparatus to form at least one wireless connection with each of the current access network, the target access network and the at least one intermediate access network, wherein data sent via the connection with the at least one intermediate access network is not transmitted via the current access network or the target access network; further, check the characteristics of the target network while being in the at least one intermediate network; and make a final decision whether to perform handover from the at least one intermediate network to the target access network only after the characteristics of the target network have been checked.

7. The apparatus of claim 6, wherein the memory is further configured to store beforehand at least one criterion based on which the decision to perform the vertical handover is established.

8. The apparatus of claim 6, wherein the memory and the computer program code, with the processor, are further configured to cause the apparatus at least to further perform: select the at least one intermediate access network and the target access network from a group of access networks which the wireless apparatus sees at the time of decision making.

9. The apparatus of claim 6, wherein seamless vertical handover comprises a vertical handover without causing substantial interruption in application level connections.

10. The apparatus of claim 6, wherein the memory and the computer program code, with the processor, are further configured to cause the apparatus at least to further perform: decide that the vertical handover is performed via said at least one intermediate access network if the current access network and target access network can not be simultaneously active for the wireless apparatus.

11. The apparatus of claim 6, wherein the apparatus comprises a wireless apparatus.

12. The apparatus of claim 6, wherein the apparatus comprises a network-based apparatus or a network server.

13. A method comprising:
establishing, by a decision unit, a decision to perform a vertical handover of a wireless apparatus from a current access network to a target access network that is different from the current access network;
making a distinction, by the decision unit, between seamless and non-seamless vertical handovers when establishing the decision;
selecting, by the decision unit, the target access network from a group of available target access networks on the basis that the vertical handover is to be seamless, wherein the current access network and the target access network are configured to provide wireless devices with access to services via wireless interfaces comprised therein;
further deciding, by the decision unit, that at least one intermediate access network is used for waiting when the wireless apparatus sees the target access network but access to the target access network is temporarily unavailable;
performing the vertical handover of the wireless apparatus seamlessly by activating a connection with the at least one intermediate access network, wherein data sent via the connection with the at least one intermediate access network is not transmitted via the current access network or the target access network;
checking the characteristics of the target network while being in the at least one intermediate network; and
making a final decision whether to perform handover from the at least one intermediate network to the target access network only after the characteristics of the target network have been checked.

14. The method of claim 13, the method comprising:
establishing the decision to perform the vertical handover based on at least one beforehand stored criterion.

15. The method of claim 13, wherein the group of available target access networks comprises a group of target access networks which are available for handover at the time of decision making.

16. The method of claim 13, wherein the seamless vertical handover comprises a vertical handover without causing substantial interruption in application level connections.

17. An apparatus comprising:
a processor; and
a memory including computer program code, the memory and the computer program code configured to, with the processor, cause the apparatus at least to perform:
establish a decision to perform a vertical handover of a wireless apparatus from a current access network to a target access network that is different from the current access network; make a distinction between seamless and non-seamless vertical handovers when establishing the decision; select the target access network from a group of available target access networks on the basis that the vertical handover is to be seamless; decide that at least one intermediate access network is used for waiting when the wireless apparatus sees the target access network but access to the target access network is temporarily unavailable; perform the vertical handover seamlessly by activating a connection with the at least one intermediate access network, wherein data sent via the connection with the at least one intermediate access network is not transmitted via the current access network or the target access network; further, check the characteristics of the target network while being in the at least one intermediate network; and make a final decision whether to perform handover from the at least one intermediate network to the target access network only after the characteristics of the target network have been checked, wherein the apparatus further comprises at least one wireless interface configured to enable the apparatus to form at least one wireless connection with each of the current access network, the target access network and the at least one intermediate access network.

18. The apparatus of claim 17, wherein the memory is further configured to store beforehand at least one criterion based on which the decision to perform the vertical handover is established.

19. The apparatus of claim 17, wherein the group of available target access networks comprises a group of target access networks which are available for handover at the time of decision making.

20. The apparatus of claim 17, wherein the seamless vertical handover comprises a vertical handover without causing substantial interruption in application level connections.

21. The apparatus of claim 17, wherein the apparatus comprises a wireless apparatus.

22. The apparatus of claim 17, wherein the apparatus comprises a network-based apparatus or a network server.

* * * * *